United States Patent
Yu et al.

(10) Patent No.: US 10,579,192 B2
(45) Date of Patent: Mar. 3, 2020

(54) TOUCH PANEL AND FABRICATION METHOD THEREOF

(71) Applicants: Interface Technology (ChengDu) Co., Ltd., Sichuan (CN); Interface Optoelectronics (ShenZhen) Co., Ltd., Guangdong (CN); General Interface Solution Limited, Miaoli County (TW)

(72) Inventors: Jing-Bing Yu, Guangdong (CN); Yen-Chang Yao, Guangdong (CN); Chen-Ming Jen, Guangdong (CN); Tai-Wu Lin, Guangdong (CN)

(73) Assignees: INTERFACE TECHNOLOGY (CHENGDU) CO., LTD., Sichuan (CN); INTERFACE OPTOELECTRONICS (SHENZHEN) CO., LTD., Guangdong (CN); GENERAL INTERFACE SOLUTIONS LIMITED, Miaoli County (TW)

( * ) Notice: Subject to any disclaimer, the term of this patent is extended or adjusted under 35 U.S.C. 154(b) by 113 days.

(21) Appl. No.: 15/880,499

(22) Filed: Jan. 25, 2018

(65) Prior Publication Data

US 2019/0050077 A1 Feb. 14, 2019

(30) Foreign Application Priority Data

Aug. 14, 2017 (CN) .......................... 2017 1 0691413

(51) Int. Cl.
*G06F 3/044* (2006.01)

(52) U.S. Cl.
CPC .... *G06F 3/044* (2013.01); *G06F 2203/04103* (2013.01); *G06F 2203/04111* (2013.01); *G06F 2203/04112* (2013.01)

(58) Field of Classification Search
CPC combination set(s) only.
See application file for complete search history.

(56) References Cited

U.S. PATENT DOCUMENTS

| 2015/0009422 A1* | 1/2015 | Tung ...................... G06F 3/044 349/12 |
| 2016/0011689 A1* | 1/2016 | Kim ........................ G06F 3/044 345/173 |

* cited by examiner

*Primary Examiner* — Deeprose Subedi
(74) *Attorney, Agent, or Firm* — CKC & Partners Co., LLC

(57) ABSTRACT

The touch panel includes a transparent substrate, a first touch-sensing electrode structure, a second touch-sensing electrode structure, and a patterned metal layer. The transparent substrate has a touch-sensing region and a peripheral region adjacent to at least one edge of the touch-sensing region. The first touch-sensing electrode structure is disposed on the touch-sensing region of the transparent substrate. The second touch-sensing electrode structure is positioned over the touch-sensing region and is configured to form at least one capacitor with the first touch-sensing electrode structure. The patterned metal layer has a plurality of first through holes located in the peripheral region and is extended on a level the same as the first touch-sensing electrode structure or the second touch-sensing electrode structure.

4 Claims, 16 Drawing Sheets

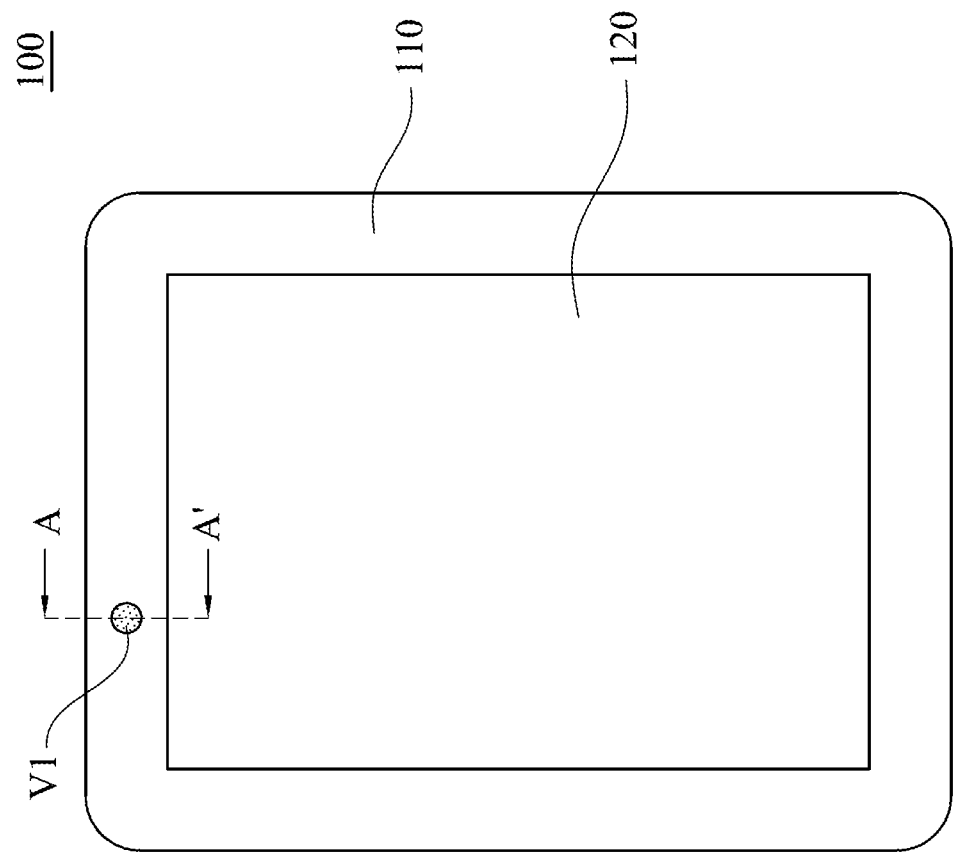
Fig. 1
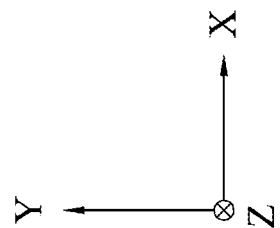

TOUCH PANEL AND FABRICATION METHOD THEREOF

RELATED APPLICATIONS

This application claims priority to Chinese Application Serial Number 201710691413.2, filed Aug. 14, 2017, which is herein incorporated by reference.

BACKGROUND

Field of Invention

The present invention relates to a touch panel and a method of fabricating a touch panel.

Description of Related Art

The demand for ambient light sensing for electronic products such as touch display devices has been increasing day by day. A photosensitive element such as a photo transistor or a photodiode may be equipped in the touch display devices to detect the intensity of incident visible light from an ambient environment, in which the photosensitive element generates electrical signals in response to the incident visible light.

The touch display device has a light sensing region for detecting the intensity of the incident light from the ambient environment. The light sensing region must meet critical optical requirements. For example, the difference in transmittance of the light sensing region have to be controlled within +/−2% for incident light in the wavelength range from 400 nm to 1000 nm. Therefore, photolithographic etching or laser technologies have been used to form a plurality of through holes in the black border layer of the touch display device to constitute the light sensing region. The incident light can be transmitted to the photosensitive element of the touch display device via the through holes such that the photosensitive element detects the incident light.

However, in the conventional techniques of photolithographic etching or laser technologies, the technical requirements for the formation of the through holes in the black border layer are crucial, and that leads to a high manufacturing cost. Moreover, in the prior art, the through holes are limited to be formed in the black border layer. Therefore, the manufacturing process and design of the touch display device are restricted.

SUMMARY

An aspect of the present invention provides a touch panel. The touch panel includes a transparent substrate, a first touch-sensing electrode structure, a second touch-sensing electrode structure, and a patterned metal layer. The transparent substrate has a touch-sensing region and a peripheral region adjacent to at least one edge of the touch-sensing region. The first touch-sensing electrode structure is disposed on the touch-sensing region of the transparent substrate. The second touch-sensing electrode structure is positioned over the touch-sensing region and is configured to form at least one capacitor with the first touch-sensing electrode structure. The patterned metal layer has a plurality of first through holes located in the peripheral region and is extended on a level the same as the first touch-sensing electrode structure or the second touch-sensing electrode structure.

In some embodiments of the present invention, the touch panel further includes a decorative layer. The decorative layer is located in both the touch-sensing region and the peripheral region and is disposed on the patterned metal layer and the first touch-sensing electrode structure. The decorative layer includes a plurality of second through holes, and the second through holes communicate with the first through holes.

In some embodiments of the present invention, a depth of each first through hole ranges from 1 μm to 6 μm.

In some embodiments of the present invention, a diameter of each first through hole ranges from 30 μm to 65 μm.

In some embodiments of the present invention, the patterned metal layer includes a same material as the first touch-sensing electrode structure or the second touch-sensing electrode structure.

In some embodiments of the present invention, the touch panel further includes a black border layer. The black border layer is located in the peripheral region and disposed over the patterned metal layer. The black border layer includes an opening, and the opening overlaps the first through holes.

Another aspect of the present invention provides a method of fabricating a touch panel. The method includes steps of (a) providing a transparent substrate having a touch-sensing region and a peripheral region adjacent to at least one edge of the touch-sensing region; (b) forming a first touch-sensing electrode structure and a patterned metal layer over the transparent substrate, wherein the first touch-sensing electrode structure is located in the touch-sensing region, the patterned metal layer is located in the peripheral region, and the patterned metal layer includes a plurality of first through holes and is extended on a level the same as the first touch-sensing electrode structure; and (c) forming a second touch-sensing electrode structure before or after step (b), wherein the second touch-sensing electrode structure is located in the touch-sensing region, and the second touch-sensing electrode structure spans the first touch-sensing electrode structure.

In some embodiments of the present invention, step (b) further includes forming a decorative layer located in the touch-sensing region and the peripheral region, wherein the decorative layer contacts the patterned metal layer and the first touch-sensing electrode structure, and a contour of the decorative layer in a top view is substantially the same as that of a collection of the patterned metal layer and the first touch-sensing electrode structure, wherein the decorative layer includes a plurality of second through holes communicated with the first through holes.

Another aspect of the present invention provides a method of fabricating a touch panel. The method includes steps of (i) providing a transparent substrate having a touch-sensing region and a peripheral region adjacent to at least one edge of the touch-sensing region; (ii) blanketly depositing a metal layer to cover the touch-sensing region and the peripheral region of the transparent substrate; and (iii) removing a portion of the metal layer to form a first touch-sensing electrode structure, a second touch-sensing electrode structure, and a patterned metal layer, wherein the first touch-sensing electrode structure and the second touch-sensing electrode structure are located in the touch-sensing region, the first touch-sensing electrode structure is spaced from the second touch-sensing electrode structure by a gap, and the patterned metal layer is located in the peripheral region and has a plurality of first through holes.

In some embodiments of the present invention, the method further includes forming a decorative layer on the metal layer after step (ii), wherein step (iii) further includes removing a portion of the decorative layer to form a patterned decorative layer, wherein the patterned decorative layer has a plurality of second through holes communicated with the first through holes.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows:

FIG. 1 is a top view of a touch panel according to an embodiment of the present invention;

DETAILED DESCRIPTION

Figure 2:
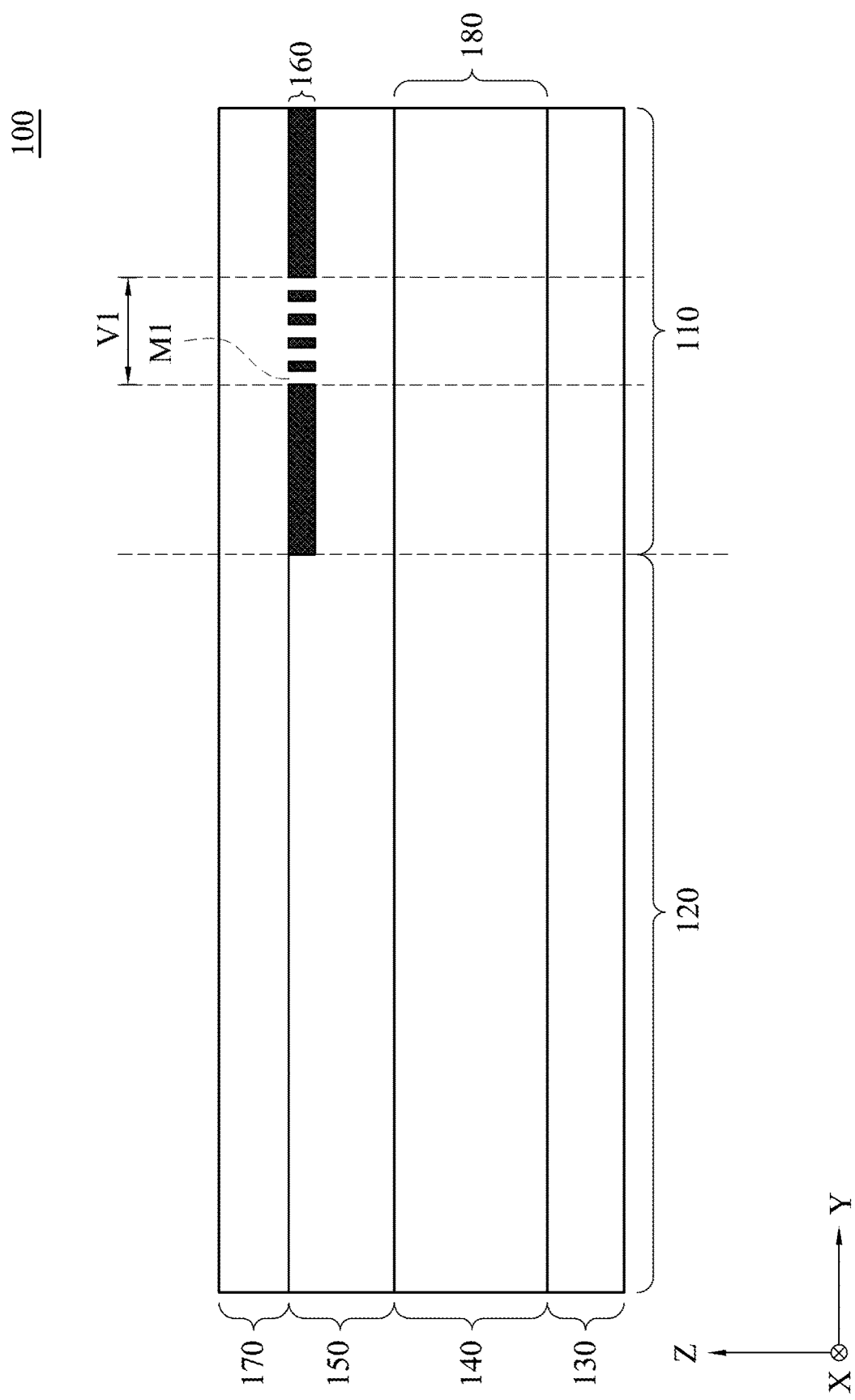
FIG. 2 is a cross-sectional view of a conventional touch panel having a ambient light sensing region, taken along the line A-A' of FIG. 1.

Reference will now be made in detail to the present embodiments of the invention, examples of which are illustrated in the accompanying drawings. Wherever possible, the same reference numbers are used in the drawings and the description to refer to the same or like parts.

FIG. 1 is a top view of a touch panel according to an embodiment of the present invention. FIG. 2 is a cross-sectional view illustrating a conventional touch panel with an ambient light sensing region V1, taken along the line A-A' of FIG. 1. As shown in FIG. 1 and FIG. 2, a touch panel 100 has an ambient light sensing region V1. The touch panel 100 includes a transparent substrate 130, a touch-sensing electrode layer 140, a cured optical adhesive layer 150, a light transparent material layer 180, and a cover glass 170. The transparent substrate 130 has a touch-sensing region 120 and a peripheral region 110. The touch-sensing electrode layer 140 is disposed on the touch-sensing region 120 of the transparent substrate 130. The light transparent material layer 180 is disposed on the peripheral region 110 of the transparent substrate 130. The cured optical adhesive layer 150 is located in the touch-sensing region 120 and the peripheral region 110, and is disposed on the touch-sensing electrode layer 140 and the light transparent material layer 180. The cover glass 170 is located in the touch-sensing region 120 and the peripheral region 110, and is disposed on the cured optical adhesive layer 150. The cover glass 170 has a black border layer 160 formed thereon. The black border layer 160 is located in the peripheral region 110 and includes a plurality of through holes M1. Therefore, in the touch panel 100 of FIG. 2, the through holes M1 are located in the ambient light sensing region V1. The ambient light can enter the touch display device via the through holes M1, thereby allowing the photosensitive element in the touch display device to sense the incident ambient light.

Figure 3:
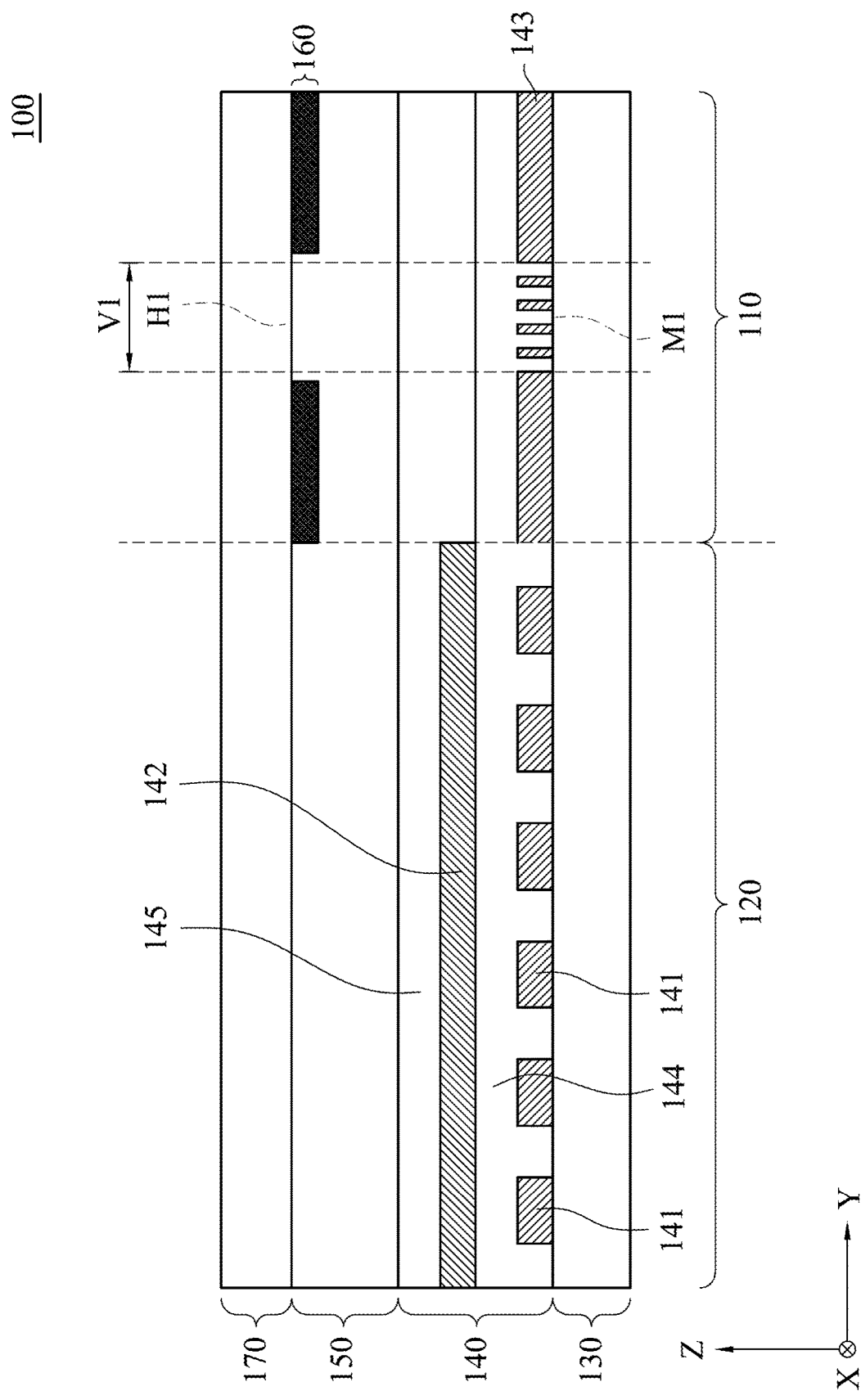
FIG. 3 is a cross-sectional view of a touch panel of an embodiment of the present invention, taken along the line A-A' of FIG. 1.

FIG. 3 is a cross-sectional view illustrating a touch panel along the line A-A' of FIG. 1 according to an embodiment of the present invention. As shown in FIG. 3, the touch panel 100 includes a transparent substrate 130, a first touch-sensing electrode structure 141, a patterned metal layer 143, a second touch-sensing electrode structure 142, a first light transparent insulating portion 144, a second light transparent insulating portion 145, a cured optical adhesive layer 150, and a cover glass 170. The transparent substrate 130 has a touch-sensing region 120 and a peripheral region 110. The first touch-sensing electrode structure 141 is disposed on the touch-sensing region 120 of the transparent substrate 130. The patterned metal layer 143 is disposed on the peripheral region 110 of the transparent substrate 130. The patterned metal layer 143 is extended on a level the same as the first touch-sensing electrode structure 141. The patterned metal layer 143 has a plurality of through holes M1. The first light transparent insulating portion 144 is located in the touch-sensing region 120 and the peripheral region 110, and covers the first touch-sensing electrode structure 141 and the patterned metal layer 143. The second touch-sensing electrode structure 142 is located in the touch-sensing region 120, and is disposed on the first light transparent insulating portion 144. The second touch-sensing electrode structure 142 is configured to form a capacitor with the first touch-sensing electrode structure 141 to detect contact positions. The second light transparent insulating portion 145 is located in the touch-sensing region 120 and the peripheral region 110, and covers the second touch-sensing electrode structure 142. The cured optical adhesive layer 150 is located in the touch-sensing region 120 and the peripheral region 110, and is disposed on the second light transparent insulating portion 145. The cover glass 170 is disposed on the cured optical adhesive layer 150, and covers the touch-sensing region 120 and the peripheral region 110. The cover glass 170 has a black border layer 160. The black border layer 160 is located in the peripheral region 110, and includes an opening H1. The opening H1 overlaps the through holes M1. Therefore, in the touch panel 100 of FIG. 3, the opening H1 and the through holes M1 are located in the ambient light sensing region V1, such that the ambient light can enter the touch display device via the opening H1 and the through holes M1, thereby allowing the photosensitive element (not shown) in the touch display device 100 to sense the incident ambient light.

In some embodiments, the transparent substrate 130 includes a polyethylene terephthalate (PET) substrate, a polyimide (PI) substrate, a triacetate cellulose (TAC) substrate, a polymethylmethacrylate (PMMA) substrate, or a polycarbonate (PC) substrate. In some embodiments, the thickness of the transparent substrate 130 is in a range from 50 μm to 125 μm, for example, 60 μm, 70 μm, 80 μm, 90 μm, 100 μm, 110 μm, or 120 μm.

In some embodiments, the material of the patterned metal layer 143 is copper, silver, silver bromide, or a combination thereof. In some embodiments, the thickness of the patterned metal layer 143 is in a range from 1 μm to 6 μm, for example 1.5 μm, 2 μm, 3 μm, 4 μm, 5 μm, or 5.5 μm.

In some embodiments, the diameters of the through holes M1 are in a range from 30 μm to 65 μm, for example, 35 μm, 40 μm, 45 μm, 50 μm, 55 μm, or 60 μm. If the diameters of the through holes M1 are less than 30 μm, it requires high manufacturing technologies. Therefore, it is disadvantageous in mass production, and is not beneficial to the optical effect. If the diameters of the through holes M1 are greater than 65 μm, the difference in transmittance of the light passing through the through holes M1 may exceed +/−2% in the wavelength range from 400 nm to 1000 nm. For example, the transmittance of light with a wavelength of 400 nm is 4.48%, but the transmittance of light with another wavelength in this wavelength range is 6.5%. As such, the transmittance difference between lights with different wavelengths exceeds +/−2%. In other words, under the same light sensing conditions, if the diameters of the through holes M1 are too large, the transmittance of light in the wavelength range will be affected, which is not conducive to the light sensing. In addition, when the diameters of the through holes M1 are too large, the concealment effects of the through holes M1 may be worse, so that the device looks poor in appearance.

In some embodiments, the depths of the through holes M1 are in a range from 1 μm to 6 μm, for example 1.5 μm, 2 μm, 3 μm, 4 μm, 5 μm, or 5.5 μm. If the depths of the through holes M1 are greater than 6 μm, it is unfavorable to the adhesion of the optical adhesive in the subsequent process. If the depths of the through holes M1 are less than 1 μm, it will affect the shielding performance and increase the risk of light leakage.

In some embodiments, the first light transparent insulating portion 144 and the second light transparent insulating portion 145 are made of dielectric material such as an optical clear adhesive (OCA), an epoxy resin, or a polyester. In some embodiments, the thicknesses of the first light transparent insulating portion 144 and the second light transparent insulating portion 145 are in a range from 50 μm to 300 μm, for example, 100 μm, 150 μm, 200 μm, or 250 μm.

In some embodiments, the cured optical adhesive layer 150 is formed by curing the optical adhesive for bonding the cover glass 170 with the touch-sensing electrode layer 140. In one embodiment, the optical adhesive, for example, is a transparent acrylic adhesive. The thickness of the cured optical adhesive layer 150 is in a range from 50 μm to 150 μm, for example, 75 μm, 100 μm, or 125 μm.

In some embodiments, the material of the black border layer 160 is ink. The thickness of the black border layer 160 is in a range from 6 μm to 15 μm, for example, 8 μm, 10 μm, or 12 μm.

In some embodiments, the materials of the first touch-sensing electrode structure 141 and the second touch-sensing electrode structure 142 are copper, silver, silver bromide, or combinations thereof. The thicknesses of the first touch-sensing electrode structure 141 and the second touch-sensing electrode structure 142 are in a range from 1 μm to 6 μm, for example, 1.5 μm, 2 μm, 3 μm, 4 μm, 5 μm, or 5.5 μm.

In one embodiment, the first touch-sensing electrode structure 141 in FIG. 3 is a first metal mesh structure, and the second touch-sensing electrode structure 142 in FIG. 3 is a second metal mesh structure.

A method of fabricating the touch panel shown in FIG. 3 is also provided herein, and the method includes the steps described below. First, a transparent substrate 130 having a touch-sensing region 120 and a peripheral region 110 is provided, and the peripheral region 110 is adjacent to at least one edge of the touch-sensing region 120. Next, a first metal layer is deposited in a blanket manner to cover the touch-sensing region 120 and the peripheral region 110 of the transparent substrate 130. In one embodiment, the method of depositing the first metal layer includes physical vapor deposition (PVD) or chemical vapor deposition (CVD). Next, a portion of the first metal layer is removed to form a first touch-sensing electrode structure 141 and a patterned metal layer 143. The first touch-sensing electrode structure 141 is located in the touch-sensing region 120. The patterned metal layer 143 is located in the peripheral region 110, and has a plurality of first through holes M1. In one embodiment, the method of removing the portion of the first metal layer includes dry etching or wet etching processes. In other words, the first touch-sensing electrode structure 141 and the patterned metal layer 143 are formed from the same metal layer using the same patterning process. Next, a light transparent insulating material is coated on the first touch-sensing electrode structure 141 and the patterned metal layer 143 to form a first light transparent insulating portion 144. In this embodiment, the light transparent insulating material covers the first touch-sensing electrode structure 141 and the patterned metal layer 143, and fills the first through holes M1 of the patterned metal layer 143, so that there exists no any void gap between the first light transparent insulating portion 144 and each of the first touch-sensing electrode structure 141, the patterned metal layer 143, and the surface of the transparent substrate 130. Next, a second metal layer is deposited in a blanket manner to cover the first light transparent insulating portion 144. In one embodiment, the method of depositing the second metal layer includes physical vapor deposition (PVD) or chemical vapor deposition (CVD). Next, a portion of the second metal layer is removed to form a second touch-sensing electrode structure 142. The second touch-sensing electrode structure 142 is located in the touch-sensing region 120. The second touch-sensing electrode structure 142 crosses over the first touch-sensing electrode structure 141. In one embodiment, the method of removing the portion of the second metal layer includes dry etching or wet etching processes.

Figure 4:
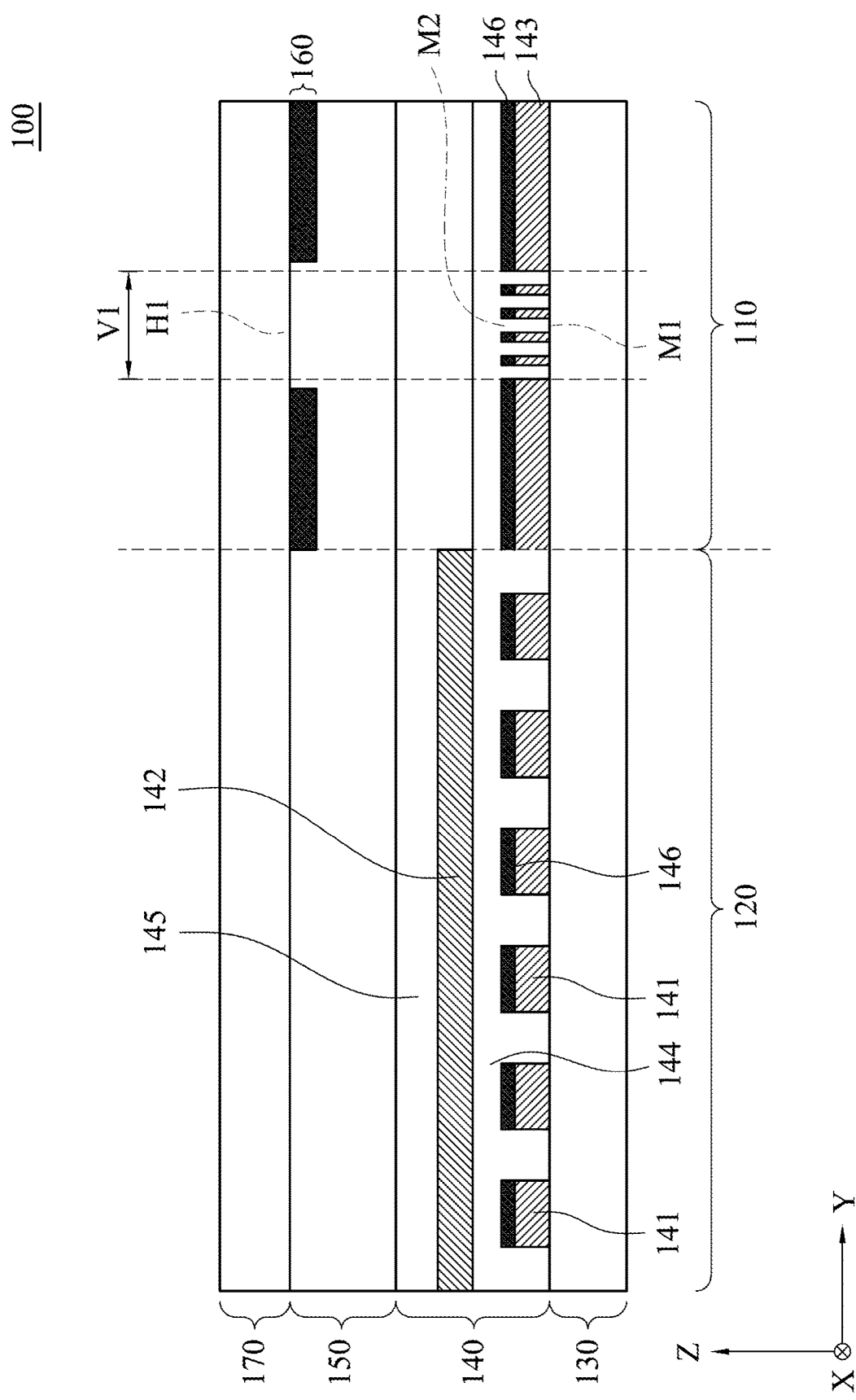
FIG. 4 is a cross-sectional view of a touch panel of an embodiment of the present invention, taken along the line A-A' of FIG. 1.

FIG. 4 illustrates a cross-sectional view of a touch panel according to another embodiment of the present invention, taken along the line A-A' of FIG. 1. The touch panel of FIG. 4 is similar to the touch panel of FIG. 3, except that the touch panel 100 of FIG. 4 further includes a patterned decorative layer 146. The patterned decorative layer 146 is located in the touch-sensing region 120 and the peripheral region 110.

The patterned decorative layer 146 is disposed on the patterned metal layer 143 and the first touch-sensing electrode structure 141. The patterned decorative layer 146 includes a plurality of through holes M2, and the through holes M2 communicate with the through holes M1. In other words, the contour or pattern of the patterned decorative layer 146 in a top view is substantially the same as that of the collection of the patterned metal layer 143 and the first touch-sensing electrode structure 141.

In some embodiments, the patterned decorative layer 146 has the same color as the black border layer 160. If the colors of the black border layer 160 and the patterned metal layer 143 are different, the patterned decorative layer 146 may be disposed on patterned metal layer 143. Thus, by adjusting the color of the patterned decorative layer 146, the device looks good in appearance while satisfying the optical function of the device.

A method of fabricating the touch panel shown in FIG. 4 is also provided herein. The difference between this method and the method of fabricating the touch panel of FIG. 3 is in that a decorative layer is deposited on the first metal layer after blanketly depositing the first metal layer. Next, a portion of the first metal layer and a portion of the decorative layer are removed to form a first touch-sensing electrode structure 141, a patterned metal layer 143, and a patterned decorative layer 146. The patterned decorative layer 146 has a plurality of second through holes M2, and the second through holes M2 communicate with the first through holes M1. The methods of forming the first light transparent insulating portion 144 and the second touch-sensing electrode structure 142 in FIG. 4 are the same as that described above in connection with FIG. 3, and the descriptions are omitted herein to avoid repetition.

Figure 5:
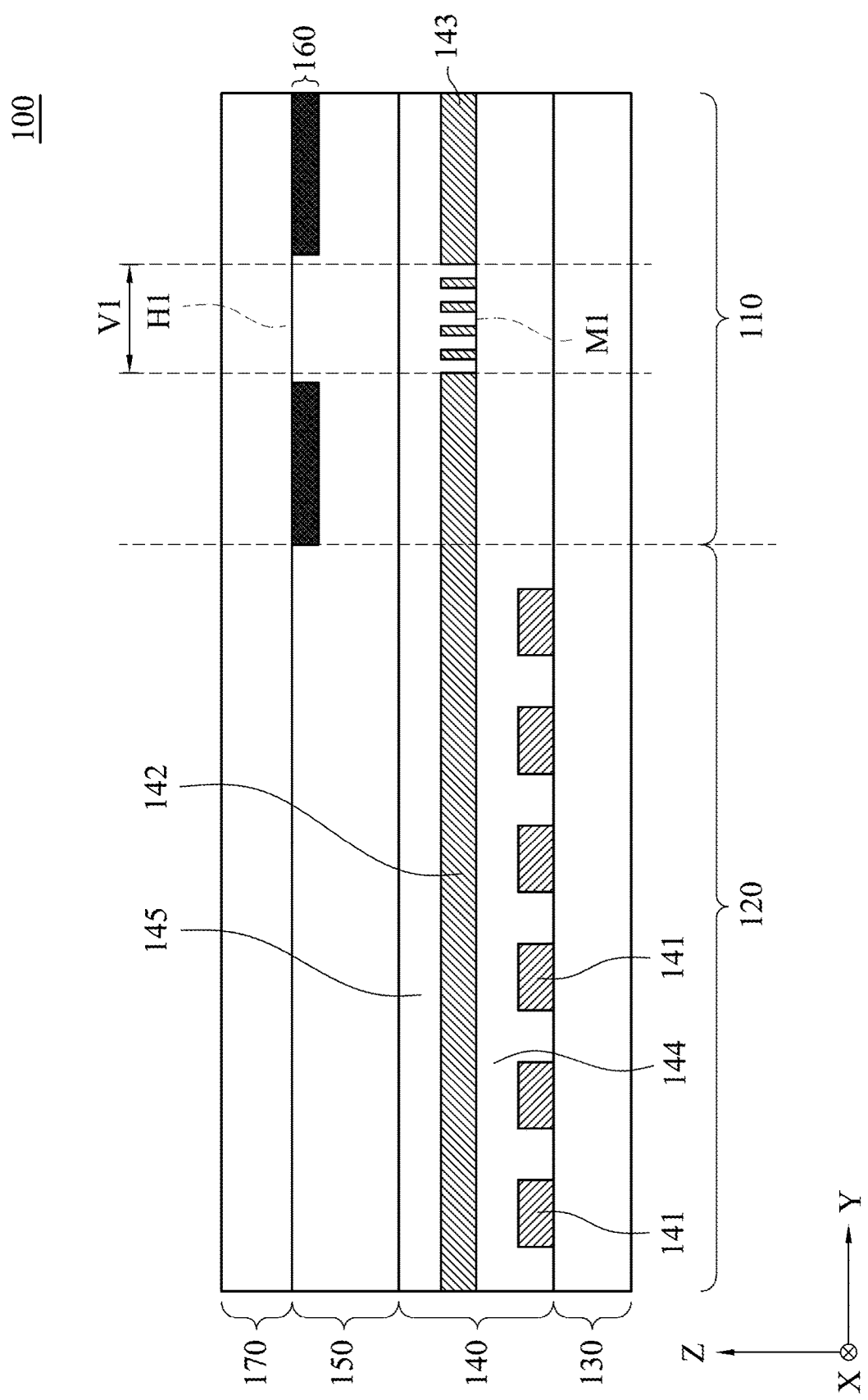
FIG. 5 is a cross-sectional view of a touch panel of an embodiment of the present invention, taken along the line A-A' of FIG. 1.

FIG. 5 illustrates a cross-sectional view of a touch panel according to another embodiment of the present invention, taken along the line A-A' of FIG. 1. The touch panel of FIG. 5 is similar to the touch panel of FIG. 3, except that the patterned metal layer 143 of the touch panel 100 in FIG. 5 is disposed on the first light transparent insulating portion 144. The patterned metal layer 143 is extended on a level the same as the second touch-sensing electrode structure 142. The second light transparent insulating portion 145 is located in the touch-sensing region 120 and the peripheral region 110, and covers the second touch-sensing electrode structure 142 and the patterned metal layer 143.

A method of fabricating the touch panel shown in FIG. 5 is also provided herein, the difference between this method and the method of fabricating the touch panel of FIG. 3 is in that the selective removal of the first metal layer forms the first touch-sensing electrode structure 141 only. In addition, after removing a portion of the second metal layer, the second touch-sensing electrode structure 142 and the patterned metal layer 143 are simultaneously formed. In other words, the second touch-sensing electrode structure 142 and the patterned metal layer 143 are formed from the same metal layer using the same patterning process. The methods of forming the first metal layer, the second metal layer, and the first light transparent insulating portion 144 in FIG. 5 are the same as that described above in connection with FIG. 3, and the descriptions are omitted herein to avoid repetition.

Figure 6:
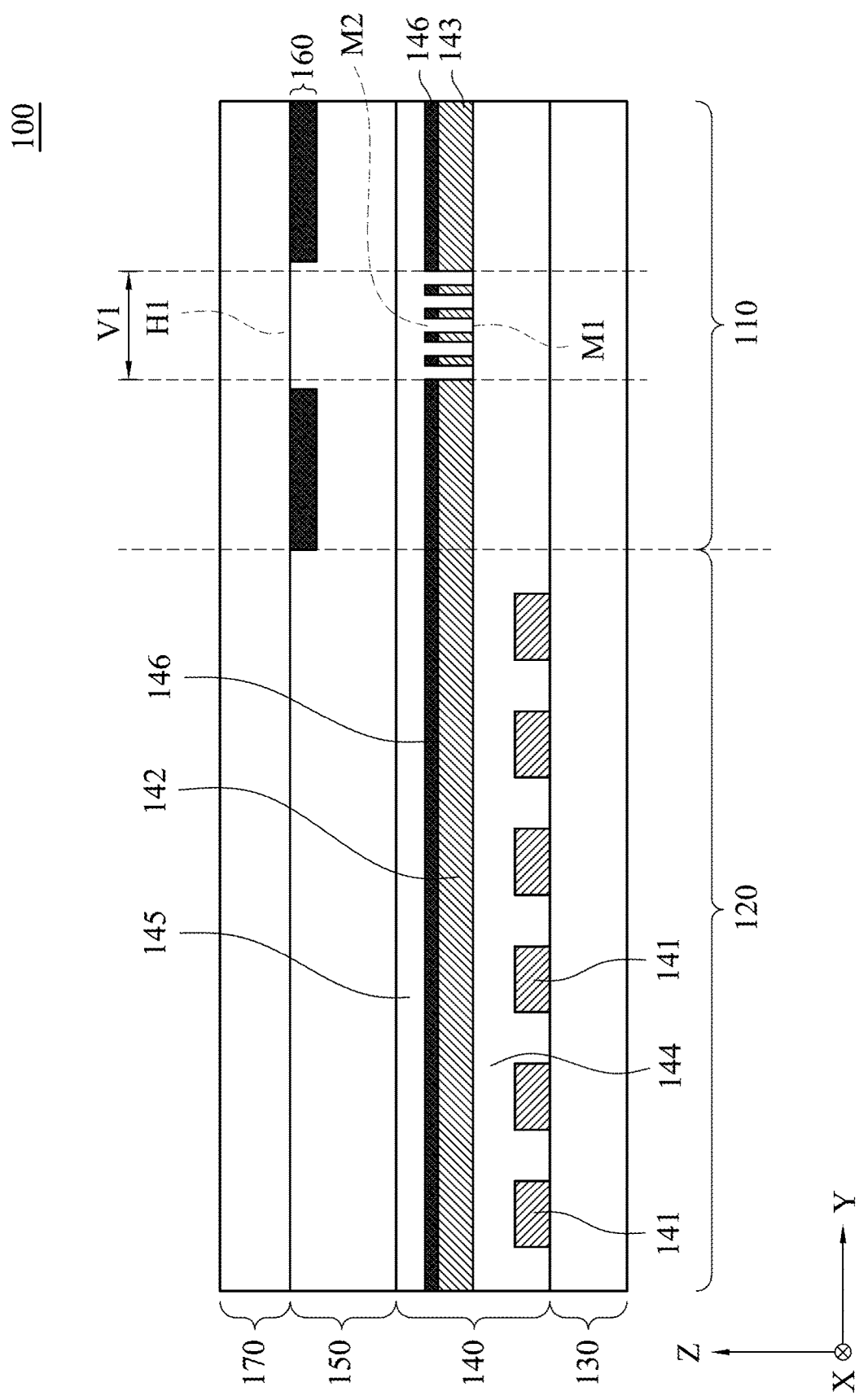
FIG. 6 is a cross-sectional view of a touch panel of an embodiment of the present invention, taken along the line A-A' of FIG. 1.

FIG. 6 illustrates a cross-sectional view of a touch panel according to another embodiment of the present invention, taken along the line A-A' of FIG. 1. The touch panel of FIG. 6 is similar to the touch panel of FIG. 5, except that the touch panel 100 of FIG. 6 further includes a patterned decorative layer 146. The patterned decorative layer 146 is located in the touch-sensing region 120 and the peripheral region 110.

The patterned decorative layer 146 is disposed on the patterned metal layer 143 and the second touch-sensing electrode structure 142. The patterned decorative layer 146 includes a plurality of through holes M2, and the through holes M2 communicate with the through holes M1.

A method of fabricating the touch panel shown in FIG. 6 is also provided herein, the difference between this method and the method of fabricating the touch panel of FIG. 5 is in that a decorative layer is deposited on the second metal layer after blanketly depositing the second metal layer on the first light transparent insulating portion 144. Next, a portion of the second metal layer and a portion of the decorative layer are removed to form a second touch-sensing electrode structure 142, a patterned metal layer 143, and a patterned decorative layer 146. The patterned decorative layer 146 has a plurality of second through holes M2, and the second through holes M2 communicate with the first through holes M1. The methods of forming the first touch-sensing electrode structure 141 and the first light transparent insulating portion 144 in FIG. 6 are the same as that described above in connection with FIG. 5, and the descriptions are omitted herein to avoid repetition.

Figure 7:
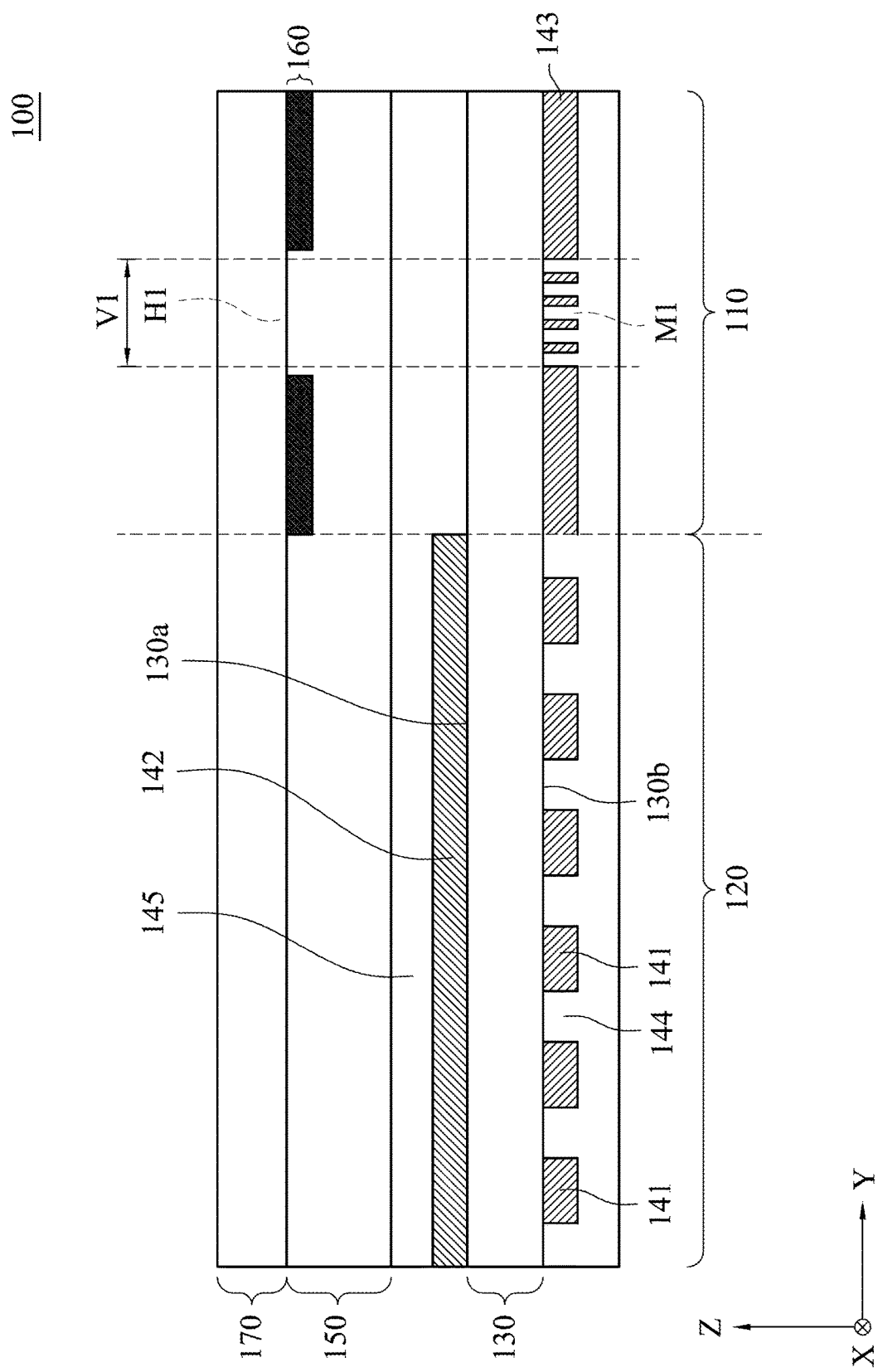
FIG. 7 is a cross-sectional view of a touch panel of an embodiment of the present invention, taken along the line A-A' of FIG. 1.

FIG. 7 illustrates a cross-sectional view of a touch panel according to another embodiment of the present invention, taken along the line A-A' of FIG. 1. As shown in FIG. 7, the touch panel 100 includes a transparent substrate 130, a first touch-sensing electrode structure 141, a patterned metal layer 143, a second touch-sensing electrode structure 142, a first light transparent insulating portion 144, a second light transparent insulating portion 145, a cured optical adhesive layer 150, and a cover glass 170. The transparent substrate 130 has a touch-sensing region 120 and a peripheral region 110, and the transparent substrate 130 has an upper surface 130a and a lower surface 130b opposite to the upper surface 130a. The first touch-sensing electrode structure 141 is disposed on the lower surface 130b of the touch-sensing region 120 of the transparent substrate 130. The patterned metal layer 143 is disposed on the lower surface 130b of the peripheral region 110 of the transparent substrate 130. The patterned metal layer 143 is extended on a level the same as the first touch-sensing electrode structure 141. The patterned metal layer 143 has a plurality of through holes M1. The second touch-sensing electrode structure 142 is disposed on the upper surface 130a of the touch-sensing region 120 of the transparent substrate 130. The second touch-sensing electrode structure 142 is configured to form a capacitor with the first touch-sensing electrode structure 141. The first light transparent insulating portion 144 is located in the touch-sensing region 120 and the peripheral region 110, and covers the first touch-sensing electrode structure 141 and the patterned metal layer 143. The second light transparent insulating portion 145 is located in the touch-sensing region 120 and the peripheral region 110, and covers the second touch-sensing electrode structure 142. The cured optical adhesive layer 150 is located in the touch-sensing region 120 and the peripheral region 110, and is disposed on the second light transparent insulating portion 145. The cover glass 170 covers the touch-sensing region 120 and the peripheral region 110, and is disposed on the cured optical adhesive layer 150. The cover glass 170 has a black border layer 160 formed thereon. The black border layer 160 is located in the peripheral region 110, and includes an opening H1. The opening H1 overlaps the through holes M1. Therefore, in the touch panel 100 of FIG. 7, the opening H1 and the through holes M1 are located in the ambient light sensing region V1, such that the ambient light can enter the touch display device via the opening H1 and the through holes M1, thereby allowing the photosensitive element in the touch display device to sense the incident ambient light.

A method of fabricating the touch panel shown in FIG. 7 is also provided herein, and the method includes the steps described below. First, a transparent substrate 130 having a touch-sensing region 120 and a peripheral region 110 is provided, and the peripheral region 110 is adjacent to at least one edge of the touch-sensing region 120. The transparent substrate 130 has an upper surface 130a and a lower surface 130b opposite to the upper surface 130a. Next, a first metal layer is deposited in a blanket manner to cover a surface (e.g., the lower surface 130b) of the touch-sensing region 120 and the peripheral region 110 of the transparent substrate 130. Next, a portion of the first metal layer is removed to form a first touch-sensing electrode structure 141 and a patterned metal layer 143. The first touch-sensing electrode structure 141 is located in the touch-sensing region 120. The patterned metal layer 143 is located in the peripheral region 110, and has a plurality of first through holes M1. Next, a second metal layer is deposited in a blanket manner to cover another surface (e.g., the upper surface 130a) of the touch-sensing region 120 and the peripheral region 110 of the transparent substrate 130. Next, a portion of the second metal layer is removed to form a second touch-sensing electrode structure 142. The second touch-sensing electrode structure 142 is located in the touch-sensing region 120. The second touch-sensing electrode structure 142 crosses over the first touch-sensing electrode structure 141. The subsequent steps may be the same as those described above with respect to the embodiment in FIG. 3.

Figure 8:
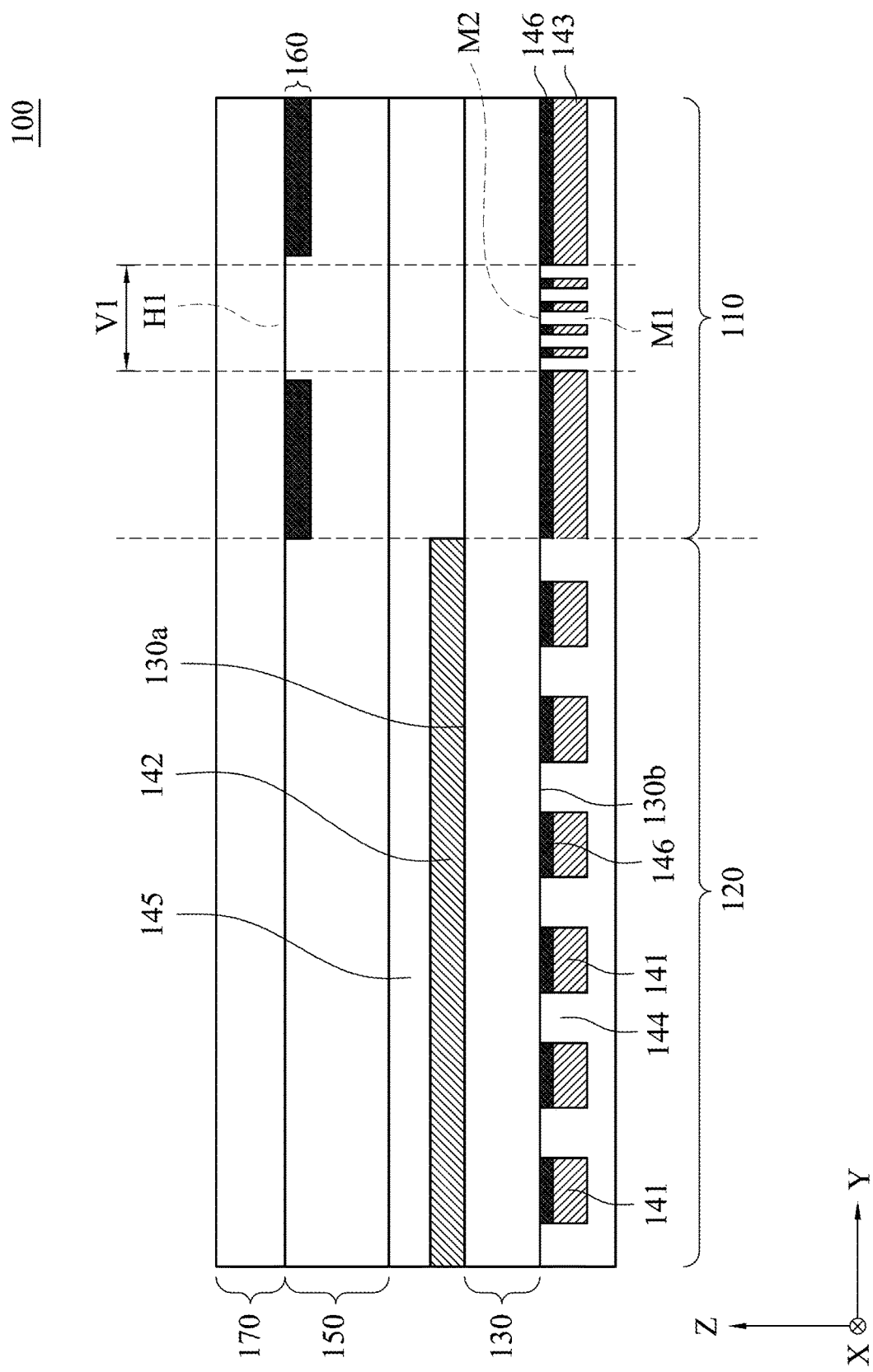
FIG. 8 is a cross-sectional view of a touch panel of an embodiment of the present invention, taken along the line A-A' of FIG. 1.

FIG. 8 illustrates a cross-sectional view of a touch panel according to another embodiment of the present invention, taken along the line A-A' of FIG. 1. The touch panel of FIG. 8 is similar to the touch panel of FIG. 7, except that the touch panel 100 of FIG. 8 further includes a patterned decorative layer 146. The patterned decorative layer 146 is located in the touch-sensing region 120 and the peripheral region 110. The patterned decorative layer 146 is disposed between the transparent substrate 130 and the patterned metal layer 143, and between the transparent substrate 130 and the first touch-sensing electrode structure 141. The patterned decorative layer 146 includes a plurality of through holes M2, and the through holes M2 communicate with the through holes M1.

A method of fabricating the touch panel shown in FIG. 8 is also provided herein, the difference between this method and the method of fabricating the touch panel of FIG. 7 is in that a decorative layer is deposited on the lower surface 130b of the touch-sensing region 120 and the peripheral region 110 of the transparent substrate 130 before blanketly depositing the first metal layer. Next, the first metal layer is deposited in a blanket manner to cover the decorative layer. Next, a portion of the first metal layer and a portion of the decorative layer are removed to form a first touch-sensing electrode structure 141, a patterned metal layer 143, and a patterned decorative layer 146. The patterned decorative layer 146 has a plurality of second through holes M2, and the second through holes M2 communicate with the first through holes M1. The method of forming the second touch-sensing electrode structure 142 in FIG. 8 is the same as that described above in connection with FIG. 7, and the descriptions are omitted herein to avoid repetition.

Figure 9:
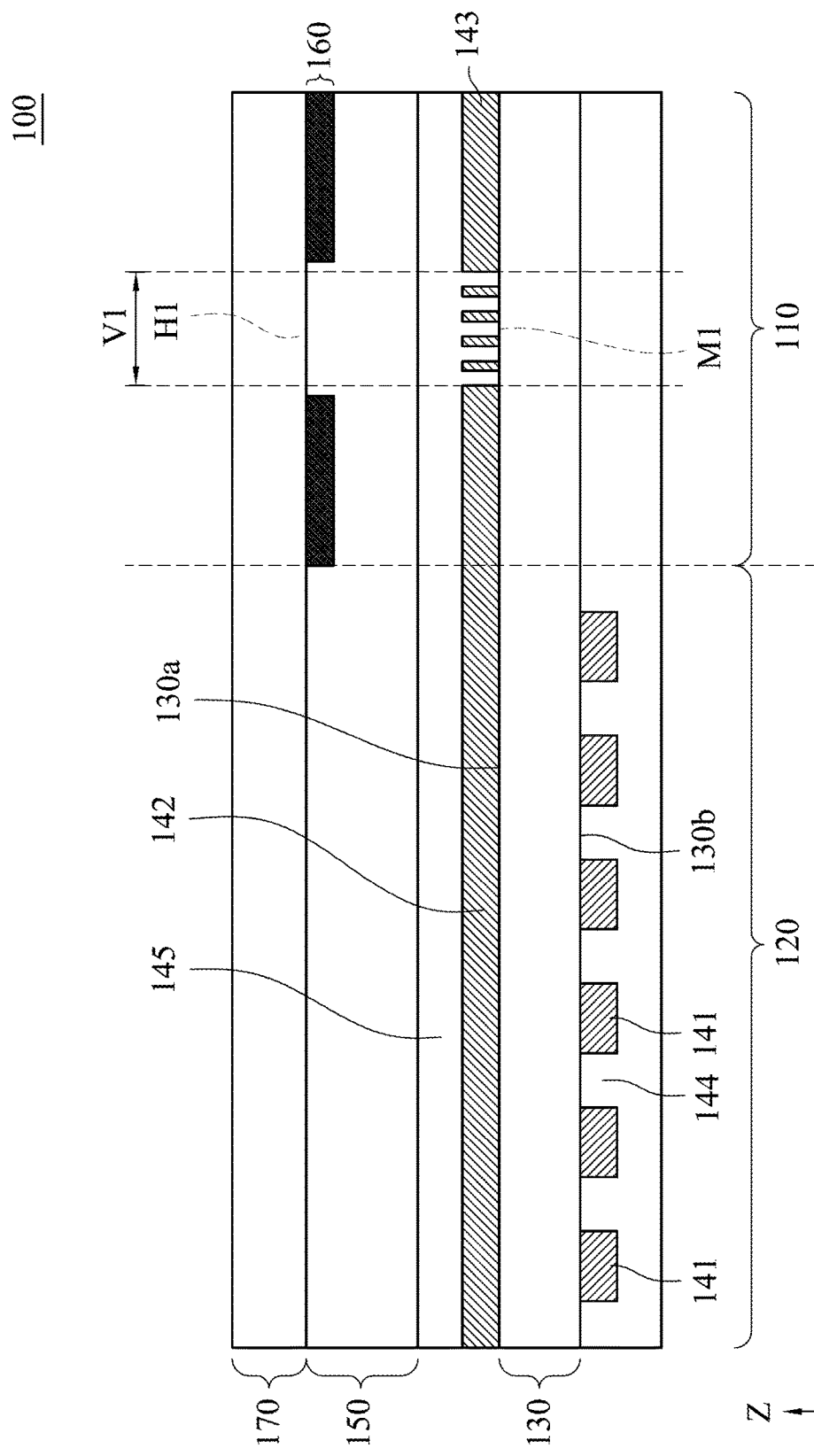
FIG. 9 is a cross-sectional view of a touch panel of an embodiment of the present invention, taken along the line A-A' of FIG. 1.

FIG. 9 illustrates a cross-sectional view of a touch panel according to another embodiment of the present invention, taken along the line A-A' of FIG. 1. The touch panel of FIG. 9 is similar to the touch panel of FIG. 7, except that the patterned metal layer 143 of the touch panel 100 of FIG. 9 is disposed on the upper surface 130a of the peripheral region 110 of the transparent substrate 130. The patterned metal layer 143 is extended on a level the same as the second touch-sensing electrode structure 142. The second light transparent insulating portion 145 is located in the touch-sensing region 120 and the peripheral region 110, and covers the second touch-sensing electrode structure 142 and the patterned metal layer 143.

A method of fabricating the touch panel shown in FIG. 9 is also provided herein, the difference between this method and the method of fabricating the touch panel of FIG. 7 is in that only the first touch-sensing electrode structure 141 is formed after selectively removing the portion of the first metal layer. In addition, after removing the portion of the second metal layer, the second touch-sensing electrode structure 142 and the patterned metal layer 143 are simultaneously formed. In other words, the second touch-sensing electrode structure 142 and the patterned metal layer 143 are formed from the same metal layer using the same patterning process. The methods of forming the first metal layer and the second metal layer in FIG. 9 are the same as that described above in connection with FIG. 7, and the descriptions are omitted herein to avoid repetition.

Figure 10:
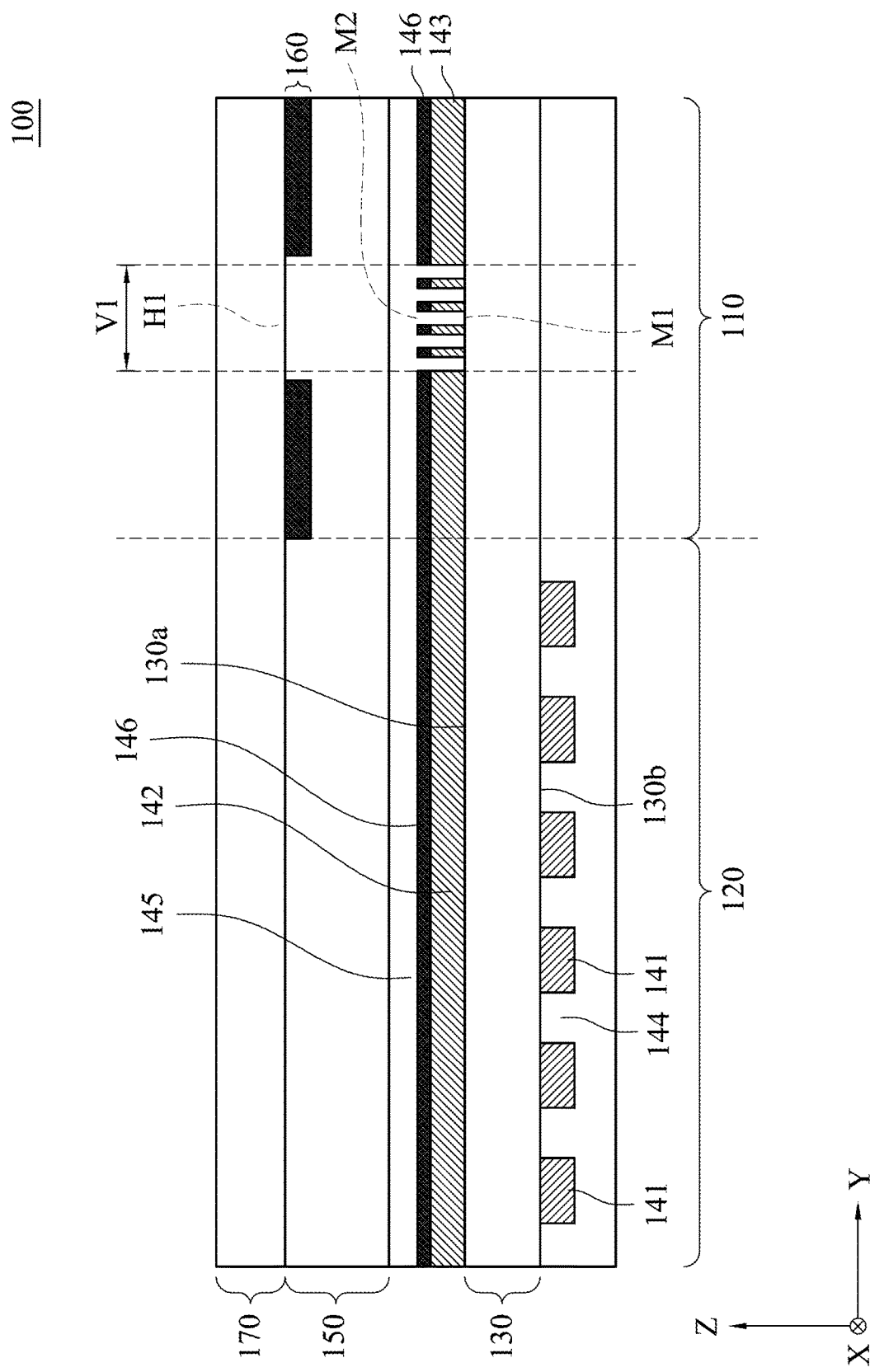
FIG. 10 is a cross-sectional view of a touch panel of an embodiment of the present invention, taken along the line A-A' of FIG. 1.

FIG. 10 illustrates a cross-sectional view of a touch panel according to another embodiment of the present invention, taken along the line A-A' of FIG. 1. The touch panel of FIG. 10 is similar to the touch panel of FIG. 9, except that the touch panel 100 of FIG. 10 further includes a patterned decorative layer 146. The patterned decorative layer 146 is located in the touch-sensing region 120 and the peripheral region 110. The patterned decorative layer 146 is disposed on the patterned metal layer 143 and the second touch-sensing electrode structure 142. The patterned decorative layer 146 includes a plurality of through holes M2, and the through holes M2 communicate with the through holes M1.

A method of fabricating the touch panel shown in FIG. 10 is also provided herein, the difference between this method and the method of fabricating the touch panel of FIG. 9 is in that a decorative layer is deposited on the second metal layer after blanketly depositing the second metal layer. Next, a portion of the second metal layer and a portion of the decorative layer are removed to form a second touch-sensing electrode structure 142, a patterned metal layer 143, and a patterned decorative layer 146. The patterned decorative layer 146 has a plurality of second through holes M2, and the second through holes M2 communicate with the first through holes M1. The method of forming the first touch-sensing electrode structure 141 in FIG. 10 is the same as that described above in connection with FIG. 9, and the descriptions are omitted herein to avoid repetition.

Figure 11:
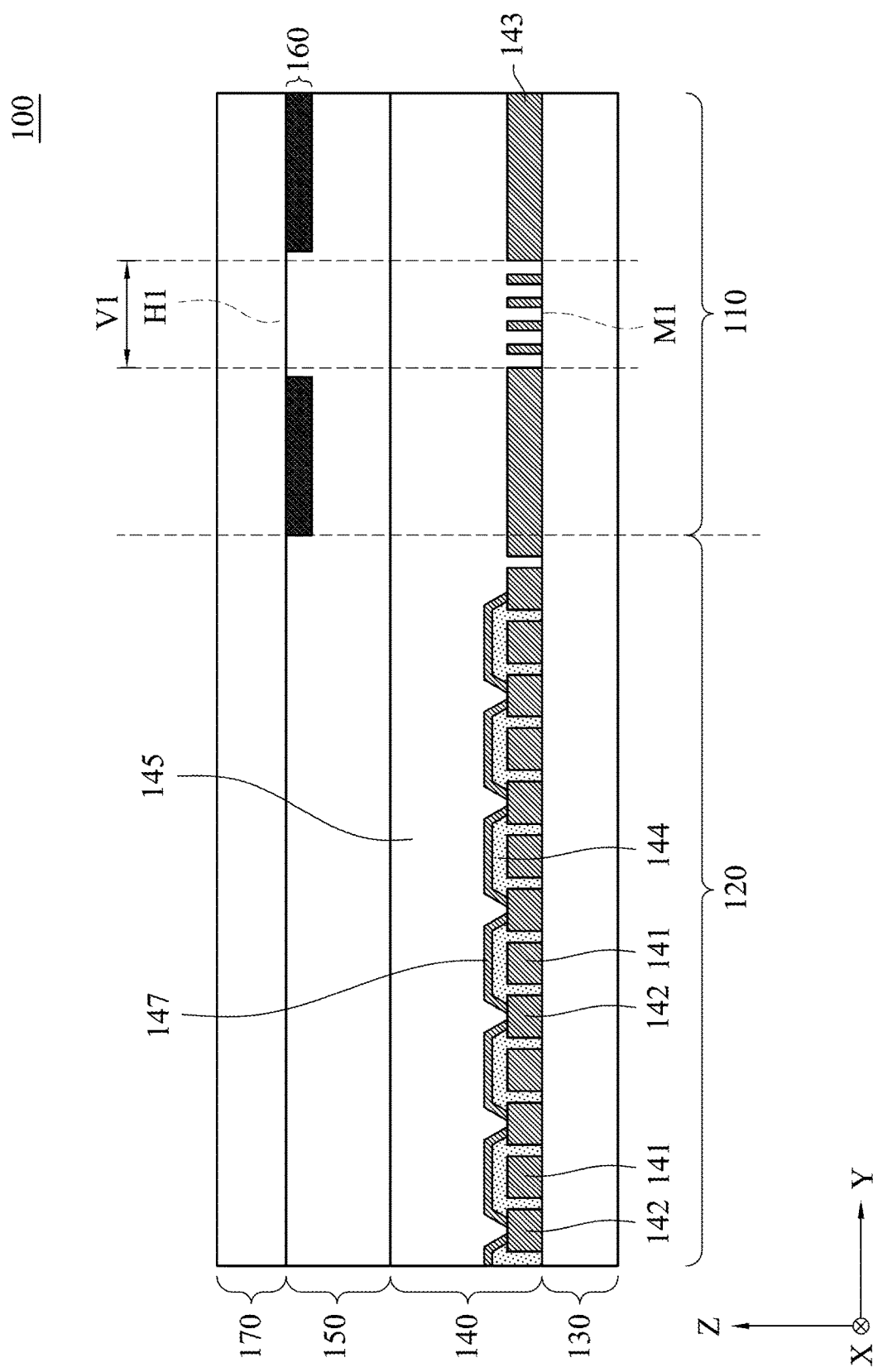
FIG. 11 is a cross-sectional view of a touch panel of an embodiment of the present invention, taken along the line A-A' of FIG. 1.
Figure 12:
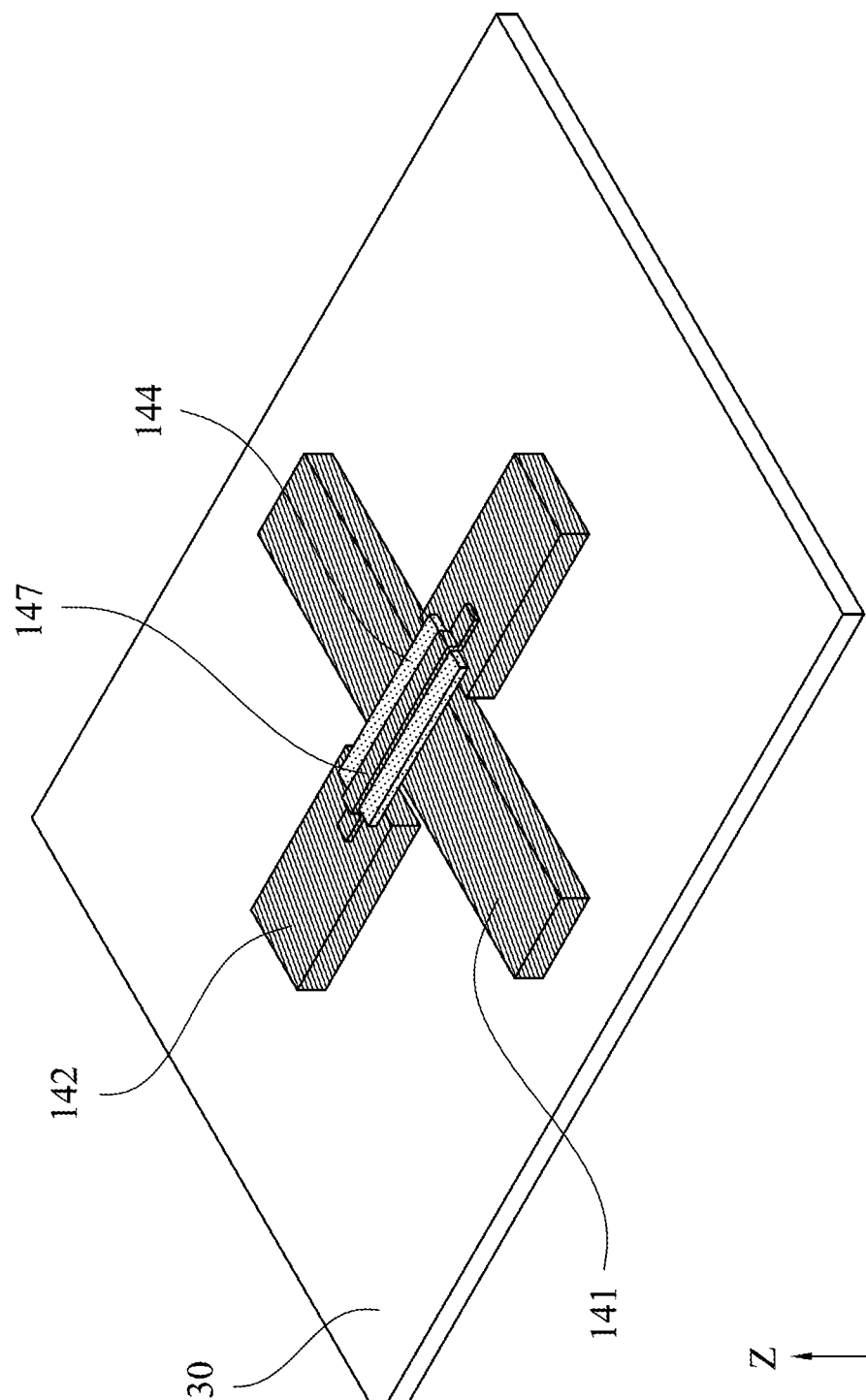
FIG. 12 is a three-dimensional diagram of a portion of a touch-sensing electrode layer of a touch panel according to an embodiment of the present invention.

FIG. 11 illustrates a cross-sectional view of a touch panel according to another embodiment of the present invention, taken along the line A-A' of FIG. 1; FIG. 12 is a perspective view illustrating a portion of a touch-sensing electrode layer of the touch panel of FIG. 11. As shown in FIG. 11 and FIG. 12, the touch panel 100 includes a transparent substrate 130, a first touch-sensing electrode structure 141, a second touch-sensing electrode structure 142, a patterned metal layer 143, a first light transparent insulating portion 144, a second light transparent insulating portion 145, a bridge wiring 147, a cured optical adhesive layer 150, and a cover glass 170. The transparent substrate 130 has a touch-sensing region 120 and a peripheral region 110. The first touch-sensing electrode structure 141 and the second touch-sensing electrode structure 142 are disposed on the touch-sensing region 120 of the transparent substrate 130. The first touch-sensing electrode structure 141 is spaced from the second touch-sensing electrode structure 142 by a gap. The second touch-sensing electrode structure 142 is configured to form a capacitor with the first touch-sensing electrode structure 141. The patterned metal layer 143 is disposed on the peripheral region 110 of the transparent substrate 130. The patterned metal layer 143 is extended on a level the same as the first touch-sensing electrode structure 141 and the second touch-sensing electrode structure 142. The patterned metal layer 143 has a plurality of through holes M1. The first light transparent insulating portion 144 is located in the touch-sensing region 120, and covers a portion of the first touch-sensing electrode structure 141. The bridge wiring 147 is located in the touch-sensing region 120, and is disposed on the first light transparent insulating portion 144. Two ends of the bridge wiring 147 are respectively connected with the portions of the second touch-sensing electrode structure 142 at opposite sides of the first touch-sensing electrode structure 141. The bridge wiring 147 is separated from the first touch-sensing electrode structure 141 by the first light transparent insulating portion 144 so that the first touch-sensing electrode structure 141 is not in direct contact with the bridge wiring 147. The second light transparent insulating portion 145 is located in the touch-sensing region 120 and the peripheral region 110, and covers the first touch-sensing electrode structure 141, the second touch-sensing electrode structure 142, the bridge wiring 147, and the patterned metal layer 143. The cured optical adhesive layer 150 is located in the touch-sensing region 120 and the peripheral region 110, and is disposed on the second light transparent insulating portion 145. The cover glass 170 is located in the touch-sensing region 120 and the peripheral region 110, and is disposed on the cured optical adhesive layer 150. The cover glass 170 has a black border layer 160. The black border layer 160 is located in the peripheral region 110, and includes an opening H1. The opening H1 overlaps the through holes M1. Therefore, in the touch panel 100 of FIG. 11, the opening H1 and the through holes M1 are located in the ambient light sensing region V1, such that the ambient light can enter the touch display device via the opening H1 and the through holes M1, thereby allowing the photosensitive element in the touch display device to sense the incident ambient light.

A method of fabricating the touch panel shown in FIG. 11 is also provided herein, and the method includes the steps described below. First, a transparent substrate 130 having a touch-sensing region 120 and a peripheral region 110 is provided, and the peripheral region 110 is adjacent to at least one edge of the touch-sensing region 120. Next, a metal layer is deposited in a blanket manner to cover the touch-sensing region 120 and the peripheral region 110 of the transparent substrate 130. Next, a portion of the metal layer is removed to form a first touch-sensing electrode structure 141, a second touch-sensing electrode structure 142, and a patterned metal layer 143. The first touch-sensing electrode structure 141 and the second touch-sensing electrode structure 142 are located in the touch-sensing region 120. The patterned metal layer 143 is located in the peripheral region 110, and has a plurality of first through holes M1. Next, a first light transparent insulating portion 144 is formed over the first touch-sensing electrode structure 141. Next, a bridge wiring 147 is formed on the first light transparent insulating portion 144 to connect with portions of the second touch-sensing electrode structure 142. Then, a second light transparent insulating portion 145 is formed to cover the formed structure described above. The subsequent steps may be the same as those described above with respect to the embodiment in FIG. 3.

Figure 13:
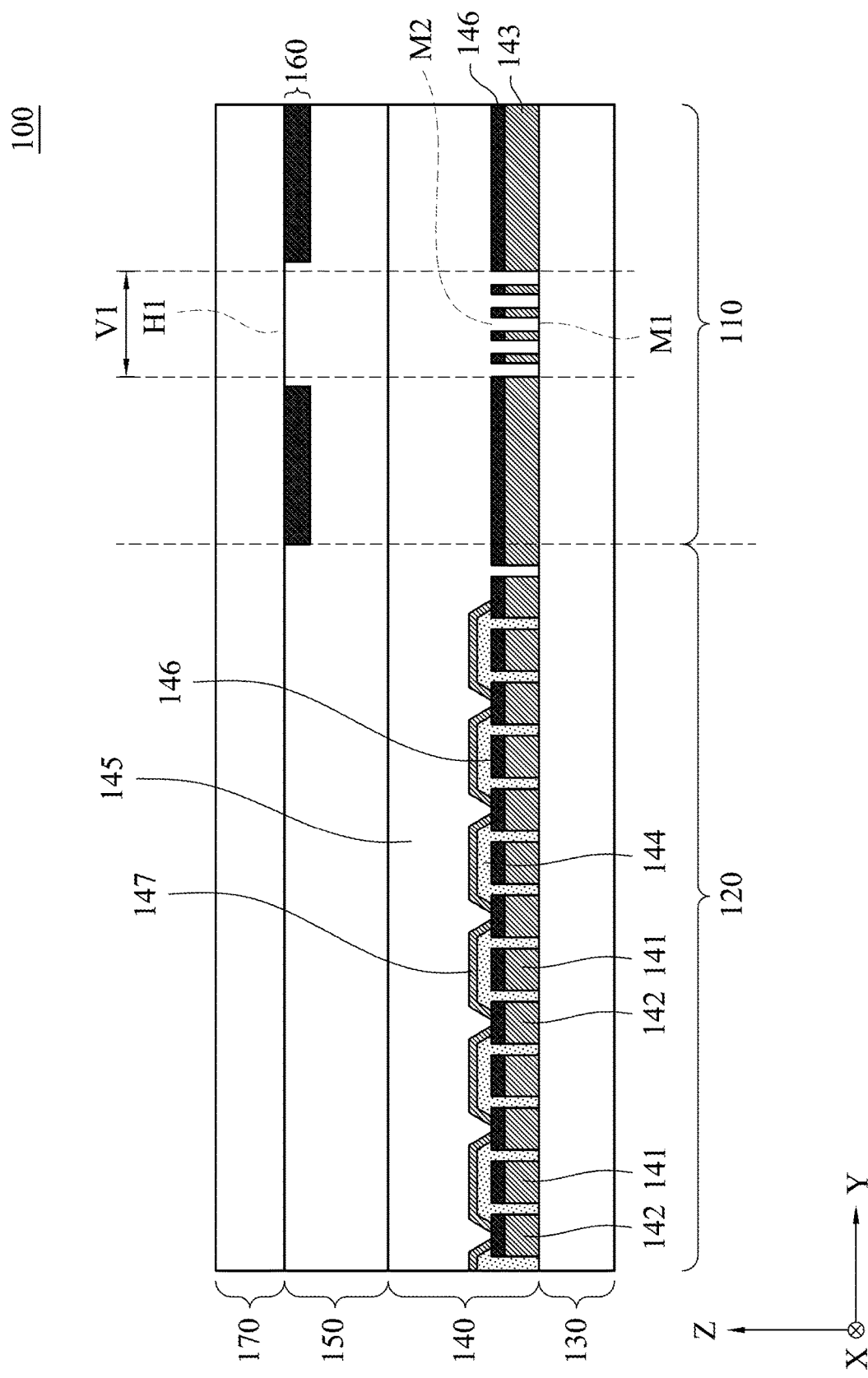
FIG. 13 is a cross-sectional view of a touch panel of an embodiment of the present invention, taken along the line A-A' of FIG. 1.

FIG. 13 illustrates a cross-sectional view of a touch panel according to another embodiment of the present invention, taken along the line A-A' of FIG. 1. The touch panel of FIG. 13 is similar to the touch panel of FIG. 11, except that the touch panel 100 of FIG. 13 further includes a patterned decorative layer 146. The patterned decorative layer 146 is located in the touch-sensing region 120 and the peripheral region 110. The patterned decorative layer 146 is disposed on the patterned metal layer 143, the first touch-sensing electrode structure 141, and the second touch-sensing electrode structure 142. The patterned decorative layer 146 includes a plurality of through holes M2, and the through holes M2 communicate with the through holes M1.

A method of fabricating the touch panel shown in FIG. 13 is also provided herein, the difference between this method and the method of fabricating the touch panel of FIG. 11 is in that a decorative layer is deposited on the metal layer after blanketly depositing the metal layer. Next, a portion of the metal layer and a portion of the decorative layer are removed to form a first touch-sensing electrode structure 141, a second touch-sensing electrode structure 142, a patterned metal layer 143, and a patterned decorative layer 146. The patterned decorative layer 146 has a plurality of second through holes M2, and the second through holes M2 communicate with the first through holes M1. The methods of forming the first light transparent insulating portion 144 and the bridge wiring 147 in FIG. 13 are the same as that described above in connection with FIG. 11, and the descriptions are omitted herein to avoid repetition.

Figure 14:
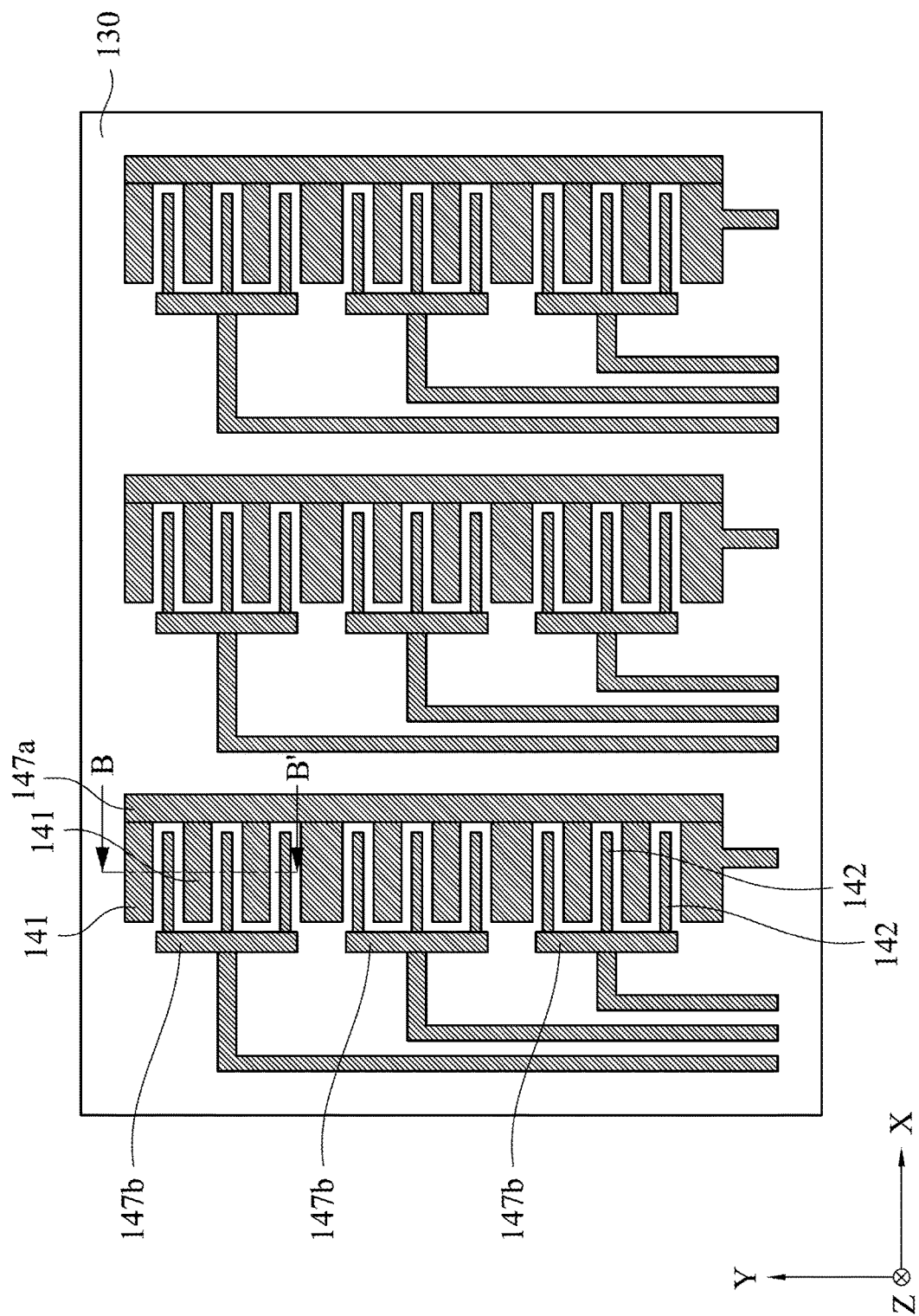
FIG. 14 is a top view of a portion of a touch-sensing electrode layer of a touch panel according to an embodiment of the present invention.
Figure 15:
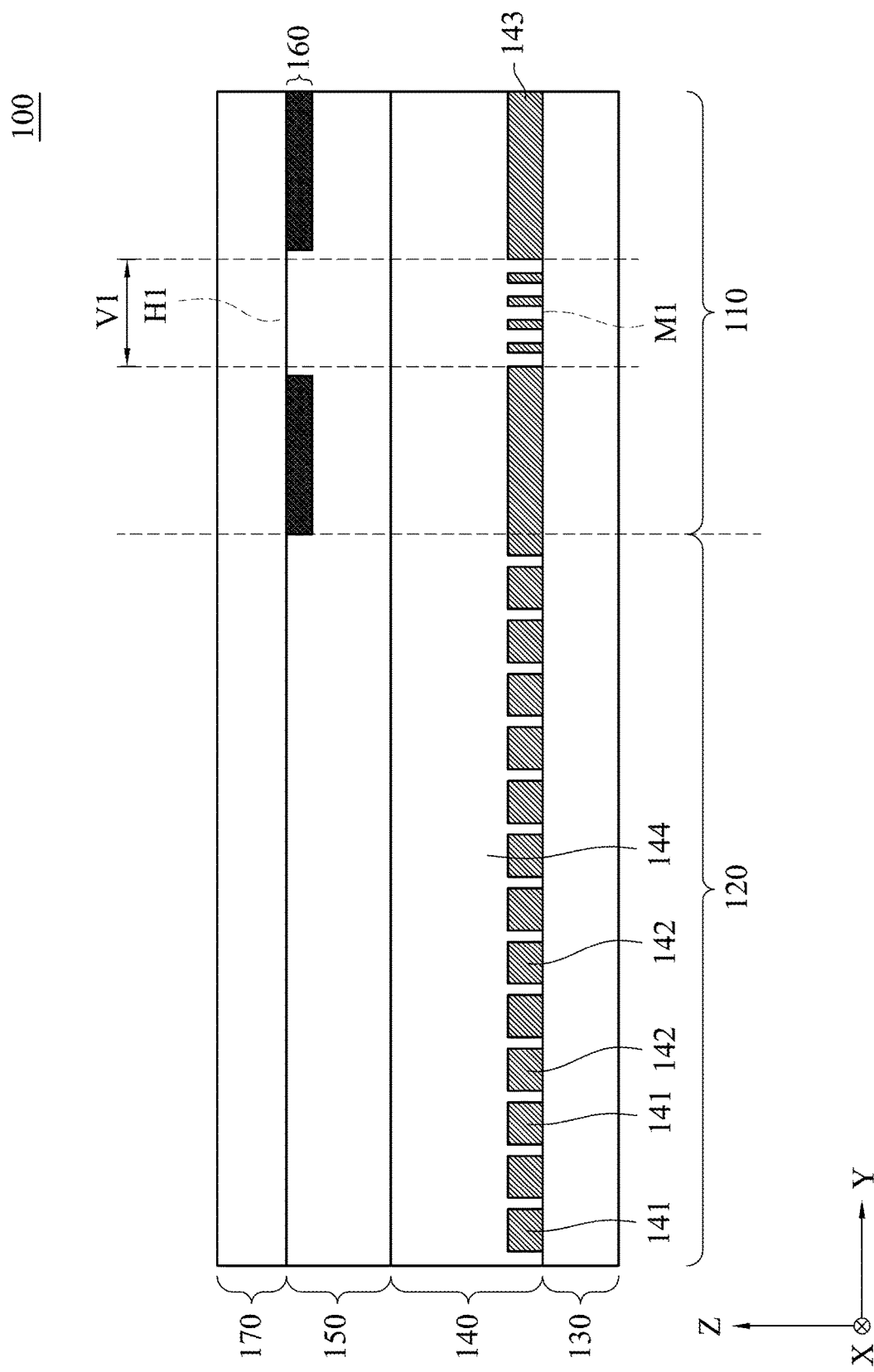
FIG. 15 is a cross-sectional view of a touch panel of an embodiment of the present invention, taken along the line A-A' of FIG. 1.

FIG. 14 is a top view illustrating a part of a touch-sensing electrode layer of a touch panel according to another embodiment of the present invention. FIG. 15 is a cross-sectional view of the touch panel including the touch-sensing electrode layer of FIG. 14, taken along approximately line B-B' of FIG. 14. As shown in FIG. 14 and FIG. 15, the touch panel 100 includes a transparent substrate 130, a first touch-sensing electrode structure 141, a second touch-sensing electrode structure 142, a patterned metal layer 143, a first light transparent insulating portion 144, a wiring 147a, a wiring 147b, a cured optical adhesive layer 150, and a cover glass 170. The transparent substrate 130 has a touch-sensing region 120 and a peripheral region 110. The first touch-sensing electrode structure 141 and the second touch-sensing electrode structure 142 are disposed on the touch-sensing region 120 of the transparent substrate 130. The first touch-sensing electrode structure 141 is spaced from the second touch-sensing electrode structure 142 by a gap. The wiring 147a is connected to the first touch-sensing electrode structure 141. The wiring 147b is connected to the second touch-sensing electrode structure 142. The second touch-sensing electrode structure 142 is configured to form a capacitor with the first touch-sensing electrode structure 141. The patterned metal layer 143 is disposed on the peripheral region 110 of the transparent substrate 130. The patterned metal layer 143 is extended on a level the same as the first touch-sensing electrode structure 141 and the second touch-sensing electrode structure 142. The patterned metal layer 143 has a plurality of through holes M1. The first light transparent insulating portion 144 is located in the touch-sensing region 120 and the peripheral region 110, and covers the first touch-sensing electrode structure 141, the second touch-sensing electrode structure 142, the wiring 147a, the wiring 147b, and the patterned metal layer 143. The cured optical adhesive layer 150 is located in the touch-sensing region 120 and the peripheral region 110, and is disposed on the first light transparent insulating portion 144. The cover glass 170 is located in the touch-sensing region 120 and the peripheral region 110, and is disposed on the cured optical adhesive layer 150. The cover glass 170 has a black border layer 160. The black border layer 160 is located in the peripheral region 110, and includes an opening H1. The opening H1 overlaps the through holes M1. Therefore, in the touch panel 100 of FIG. 15, the opening H1 and the through holes M1 are located in the ambient light sensing region V1, such that the ambient light can enter the touch display device via the opening H1 and the through holes M1, thereby allowing the photosensitive element in the touch display device to sense the incident ambient light.

A method of fabricating the touch panel shown in FIG. 15 is also provided herein, and the method includes the steps described below. First, a transparent substrate 130 having a touch-sensing region 120 and a peripheral region 110 is provided, and the peripheral region 110 is adjacent to at least one edge of the touch-sensing region 120. Next, a metal layer is deposited in a blanket manner to cover the touch-sensing region 120 and the peripheral region 110 of the transparent substrate 130. Next, a portion of the metal layer is removed to form a first touch-sensing electrode structure 141, a second touch-sensing electrode structure 142, a wiring 147a, a wiring 147b, and a patterned metal layer 143. The first touch-sensing electrode structure 141 and the second touch-sensing electrode structure 142 are located in the touch-sensing region 120. The patterned metal layer 143 is located in the peripheral region 110, and has a plurality of first through holes M1. The wiring 147a is located in the touch-sensing region 120, and is connected with the first touch-sensing electrode structure 141. The wiring 147b is located in the touch-sensing region 120, and is connected with the second touch-sensing electrode structure 142. Then, a first light transparent insulating portion 144 is formed to cover the formed structure described above. Next, a cured optical adhesive layer 150 and a cover glass 170 having a black border layer 160 are formed over the first light transparent insulating portion 144.

Figure 16:
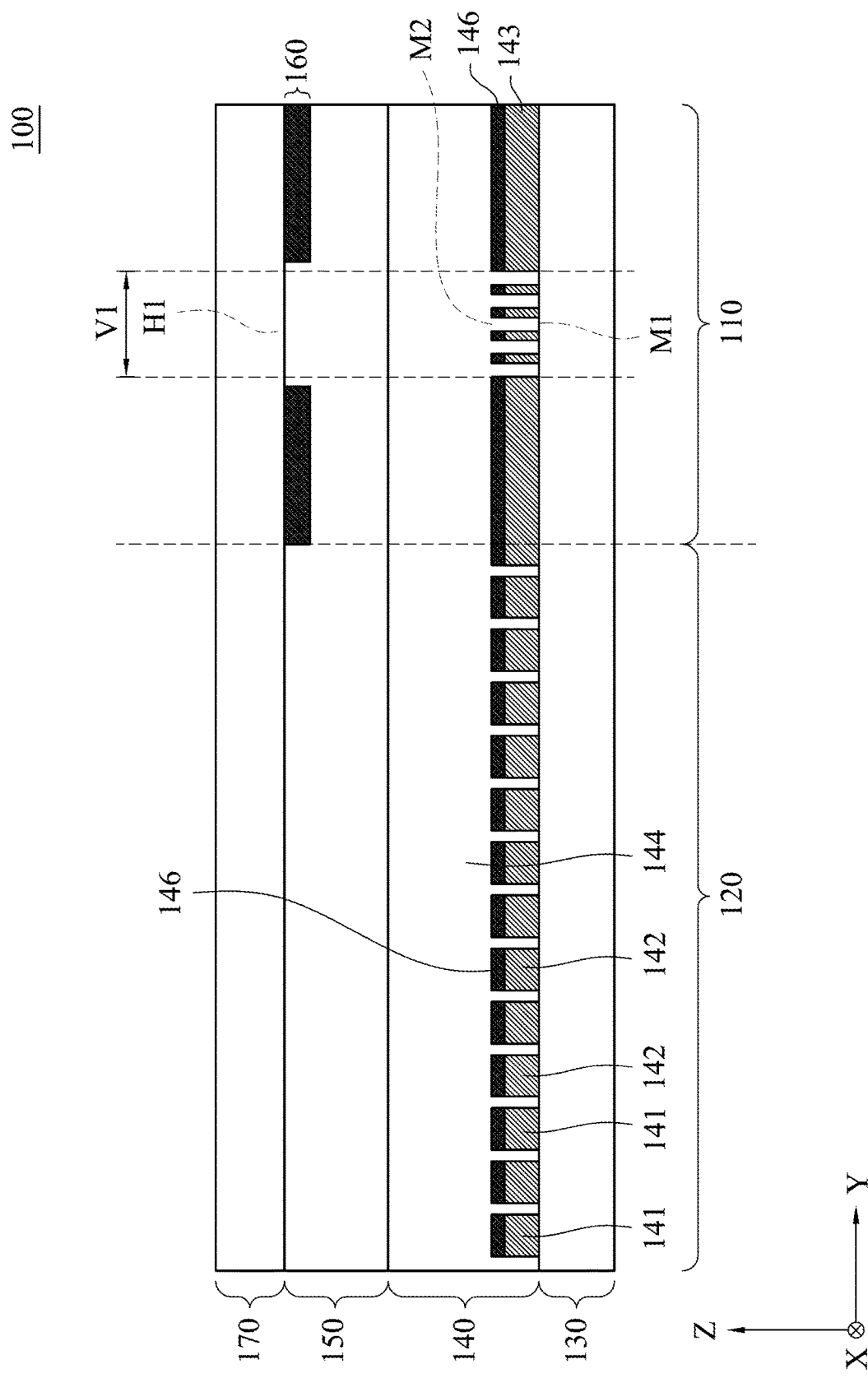
FIG. 16 is a cross-sectional view of a touch panel of an embodiment of the present invention, taken along the line A-A' of FIG. 1.

FIG. 16 illustrates a cross-sectional view of a touch panel according to another embodiment of the present invention, taken along the line A-A' of FIG. 1. The touch panel of FIG. 16 is similar to the touch panel of FIG. 15, except that the touch panel 100 of FIG. 16 further includes a patterned decorative layer 146. The patterned decorative layer 146 is located in the touch-sensing region 120 and the peripheral region 110. The patterned decorative layer 146 is disposed on the patterned metal layer 143, the first touch-sensing electrode structure 141, and the second touch-sensing electrode structure 142. The patterned decorative layer 146 includes a plurality of through holes M2, and the through holes M2 communicate with the through holes M1.

A method of fabricating the touch panel shown in FIG. 16 is also provided herein, the difference between this method and the method of fabricating the touch panel of FIG. 15 is in that a decorative layer is deposited on the metal layer after blanketly depositing the metal layer. Next, a portion of the metal layer and a portion of the decorative layer are removed to form a first touch-sensing electrode structure 141, a second touch-sensing electrode structure 142, a wiring 147a, a wiring 147b, a patterned metal layer 143, and a patterned decorative layer 146. The patterned decorative layer 146 has a plurality of second through holes M2, and the second through holes M2 communicate with the first through holes M1.

From the embodiments described above of the present invention, the touch panel disclosed herein has the following characteristics. Instead of forming through holes in the black border layer of the conventional touch panel, the through holes are formed in the metal layer of the touch panel disclosed herein. In other words, the present disclosure provides another manner to form through holes. That is, through holes are no longer confined to being formed in the black border layer, thus solving the problem that the manufacturing process and design of the device are restricted.

On the other hand, in the method of fabricating the touch panel disclosed herein, the patterned metal layer having through holes and the touch-sensing electrode structure are simultaneously formed. Compared with the prior art, the present disclosure provides a method with less process steps, thereby reducing production costs.

In addition, a patterned decorative layer may be disposed on the patterned metal layer in the touch panel of the present disclosure, such that the touch panel looks good in appearance while satisfying the optical function.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A touch panel, comprising:
    a transparent substrate having a touch-sensing region and a peripheral region adjacent to at least one edge of the touch-sensing region;
    a first touch-sensing electrode structure disposed on the touch-sensing region of the transparent substrate;
    a second touch-sensing electrode structure positioned over the touch-sensing region and configured to form at least one capacitor with the first touch-sensing electrode structure;
    a patterned metal layer having a plurality of first through holes located in the peripheral region and extended on a level the same as the first touch-sensing electrode structure or the second touch-sensing electrode structure;
    a decorative layer located in both the touch-sensing region and the peripheral region and disposed on the patterned metal layer and the first touch-sensing electrode structure, wherein the decorative layer includes a plurality of second through holes, and the second through holes communicate with the first through holes; and
    a black border layer located in the peripheral region and disposed over the patterned metal layer, wherein the black border layer includes an opening, and the opening overlaps the first through holes.

2. The touch panel of claim 1, wherein a depth of each first through hole ranges from 1 μm to 6 μm.

3. The touch panel of claim 1, wherein a diameter of each first through hole ranges from 30 μm to 65 μm.

4. The touch panel of claim 1, wherein the patterned metal layer includes a same material as the first touch-sensing electrode structure or the second touch-sensing electrode structure.

* * * * *